US005670768A

United States Patent [19]

Modiano et al.

[11] Patent Number: 5,670,768

[45] Date of Patent: Sep. 23, 1997

[54] VEHICLE MOUNTED CASH DISPENSING MACHINE

[75] Inventors: Andrea Modiano, Brussels, Belgium; Moshe Milchman, Ramat Hasharon, Israel

[73] Assignee: Inflight Financial Services Ltd., Dublin, Ireland

[21] Appl. No.: 361,947

[22] Filed: Dec. 22, 1994

[30] Foreign Application Priority Data

Dec. 24, 1993 [IL] Israel .......... 108177

[51] Int. Cl.$^{6}$ .......... G06F 17/60; G06F 17/00

[52] U.S. Cl. .......... 239/379; 235/375

[58] Field of Search .......... 235/380, 379, 235/375, 382

[56] References Cited

U.S. PATENT DOCUMENTS

| | | | |
|---|---|---|---|
| 4,578,009 | 3/1986 | Granzow et al. | 414/43 |
| 4,669,393 | 6/1987 | Wuthrich | 109/48 |
| 4,890,824 | 1/1990 | Uchida et al. | 271/3.1 |
| 4,953,086 | 8/1990 | Fukatsu | 235/379 X |
| 4,977,994 | 12/1990 | Adachi et al. | 194/210 |
| 5,036,779 | 8/1991 | Capraro | 109/24.1 |
| 5,285,926 | 2/1994 | Falk et al. | 221/2 |
| 5,299,511 | 4/1994 | Dallman et al. | 109/24.1 |

FOREIGN PATENT DOCUMENTS

| | | | |
|---|---|---|---|
| 0 010 399 | 10/1979 | European Pat. Off. | G07F 17/42 |
| 0094463 | 7/1981 | Japan | 235/379 |
| 0086666 | 5/1983 | Japan | 235/379 |
| 2225891 | 6/1990 | United Kingdom | 235/379 |

*Primary Examiner*—Donald T. Hajec
*Assistant Examiner*—Le Thien Minh
*Attorney, Agent, or Firm*—Limbach & Limbach

[57] ABSTRACT

This invention discloses a roll-on, roll-off financial services system suitable for use on transportation facilities comprising an enclosure which is mounted on wheels and which encloses at least one banknote acceptor, a card reader, a computer interfacing with at least one banknote acceptor and the card reader and at least one banknote dispenser for dispensing banknotes in response to control inputs received from the computer.

5 Claims, 5 Drawing Sheets

VEHICLE MOUNTED CASH DISPENSING MACHINE

FIELD OF THE INVENTION

The present invention relates to apparatus and methods for providing financial services.

BACKGROUND OF THE INVENTION

The use of computer controlled machines to dispense cash and to change money from one currency to another has become widespread in recent years. Such machines are generally located at fixed locations, such as outside banks or in shopping centers.

SUMMARY OF THE INVENTION

The present invention seeks to make automatic financial services available on means of transport, such as airplanes and trains, particularly those on international routes, so as to enable travelers to change their money into the currency in use at their destination or to draw money from their accounts in such currency.

There is thus provided in accordance with a preferred embodiment of the present invention a roll-on, roll-off financial services system suitable for use on transportation facilities comprising an enclosure which is mounted on wheels and which includes at least one banknote acceptor, a card reader, a computer interfacing with the at least one banknote acceptor and the card reader; and at least one banknote dispenser for dispensing banknotes in response to control inputs received from the computer.

There is also provided in accordance with a preferred embodiment of the present invention a transport vehicle comprising motive means, a passenger compartment and a financial services system disposed in the passenger compartment and comprising an enclosure enclosing at least one banknote acceptor, a card reader, a computer interfacing with the at least one banknote acceptor and the card reader; and at least one banknote dispenser for dispensing banknotes in response to control inputs received from the computer.

In accordance with a preferred embodiment of the present invention there is provided an aircraft comprising motive means, a passenger compartment and a financial services system disposed in the passenger compartment and comprising an enclosure which is mounted on wheels and which includes at least one banknote acceptor, a card reader, a computer interfacing with the at least one banknote acceptor and the card reader; and at least one banknote dispenser for dispensing banknotes in response to control inputs received from the computer.

Further in accordance with a preferred embodiment of the invention there is provided a transport vehicle comprising motive means, a passenger compartment and a financial services system disposed in the passenger compartment and comprising an enclosure which is mounted on wheels and which includes at least one banknote acceptor, a card reader, a computer interfacing with the at least one banknote acceptor and the card reader; and at least one banknote dispenser for dispensing banknotes in response to control inputs received from the computer, wherein the at least one banknote acceptor accepts banknotes at least from the country from which the transport vehicle has departed and the at least one banknote dispenser dispenses banknotes at least from the country of destination of the transport vehicle.

In accordance with a preferred embodiment of the present invention, the at least one banknote acceptor comprises two banknote acceptors, one specifically for US banknotes and a second suitable for banknotes of a plurality of countries.

Further in accordance with a preferred embodiment of the present invention a coin dispenser controlled by the computer is also provided.

In accordance with an alternative embodiment of the present invention, the banknote acceptor may be eliminated.

Still further in accordance with a preferred embodiment of the present invention there is provided a method of providing currency services during travel comprising the steps of:

- providing on a transport vehicle a financial services system comprising an enclosure which is mounted on wheels and which includes at least one banknote acceptor, a card reader, a computer interfacing with the at least one banknote acceptor and the card reader; and at least one banknote dispenser for dispensing banknotes in response to control inputs received from the computer;
- causing the at least one banknote acceptor to accept banknotes at least from the country from which the transport vehicle has departed; and
- causing the at least one banknote dispenser to dispense banknotes at least from the country of destination of the transport vehicle.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
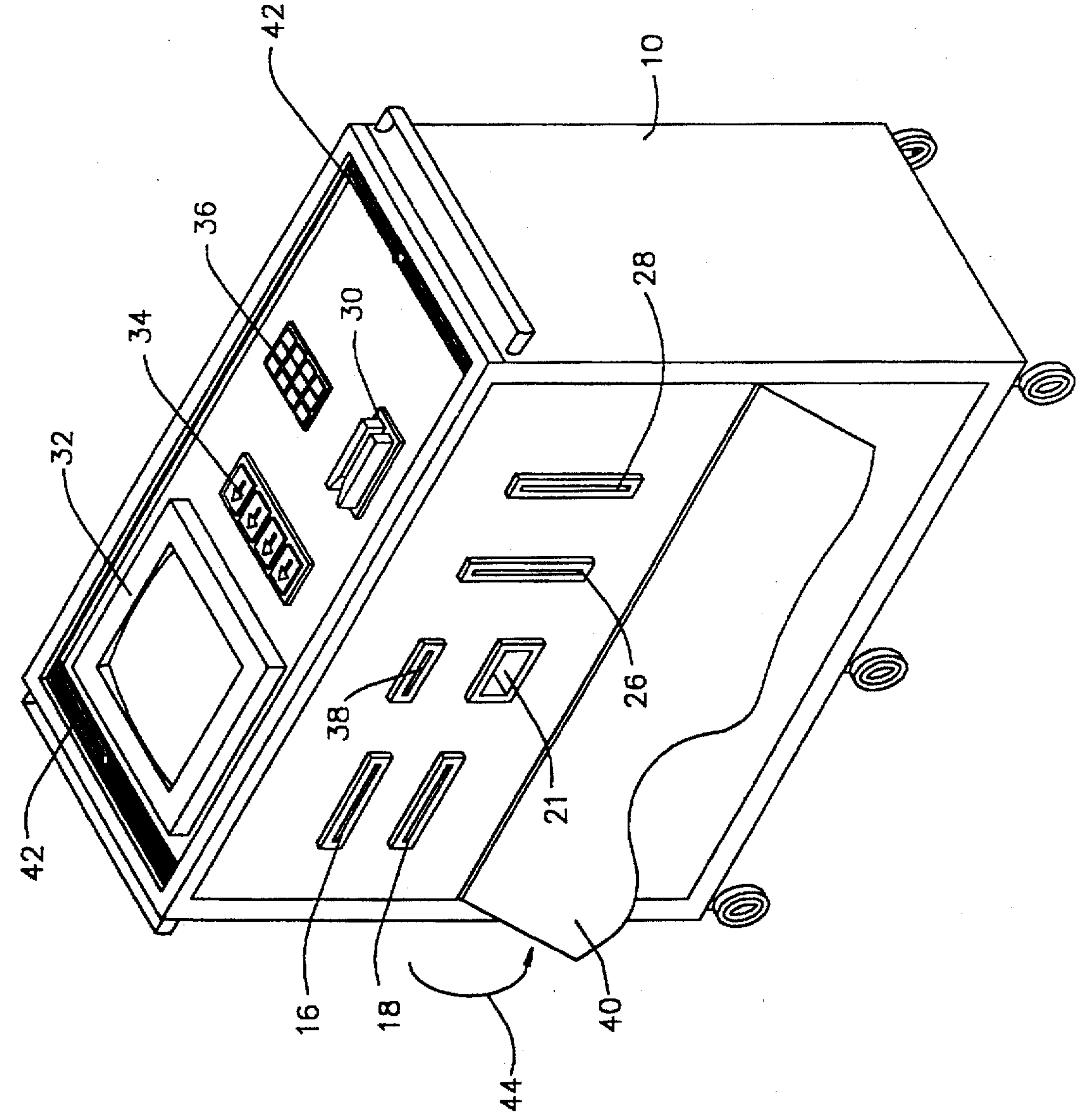
FIG. 1 is a simplified pictorial illustration of a roll-on, roll-off financial services center constructed and operative in accordance with a preferred embodiment of the present invention.
Figure 3:
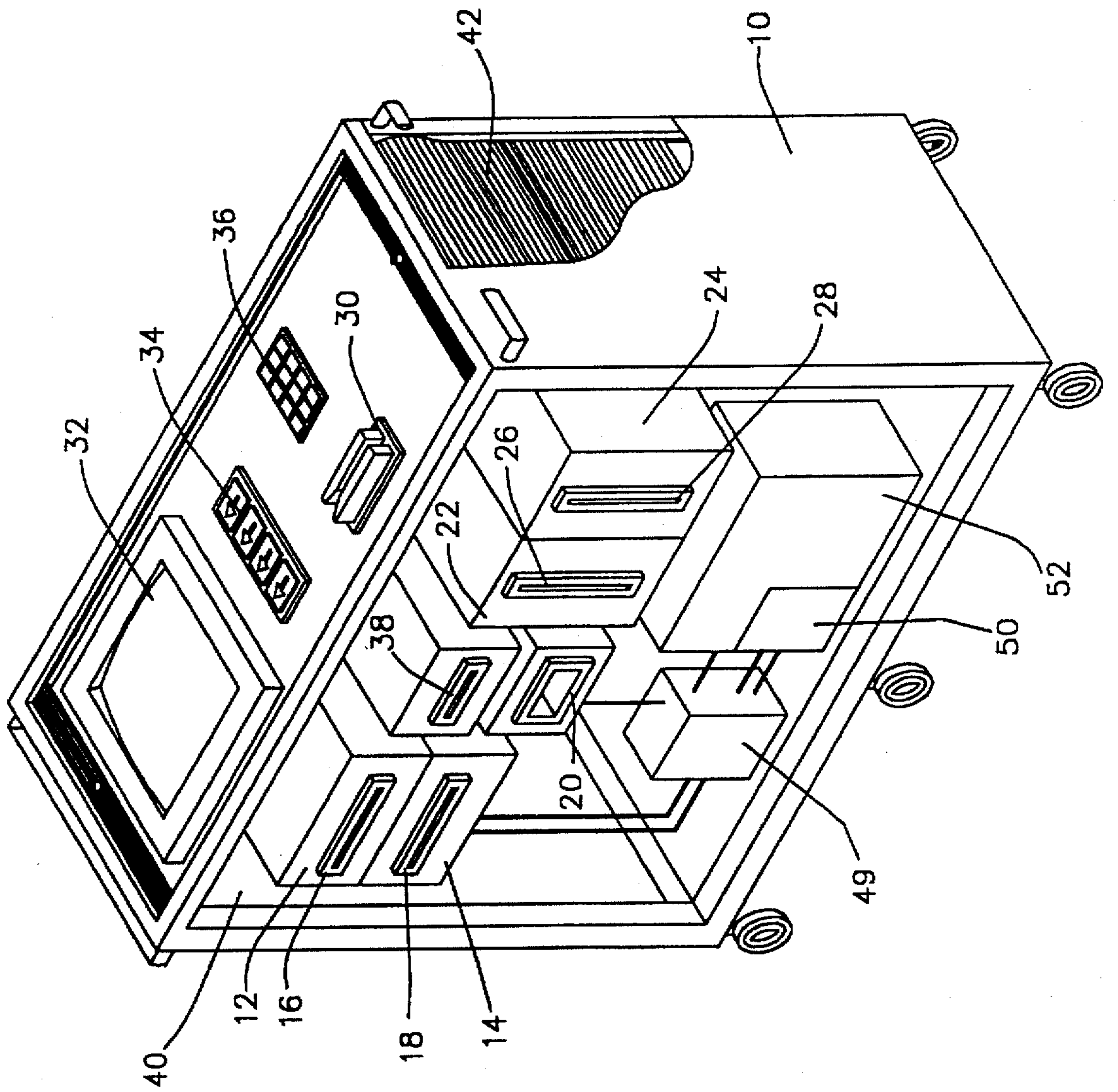
FIG. 3 is a simplified illustration showing principal components of the system of FIG. 1.
Figure 4:
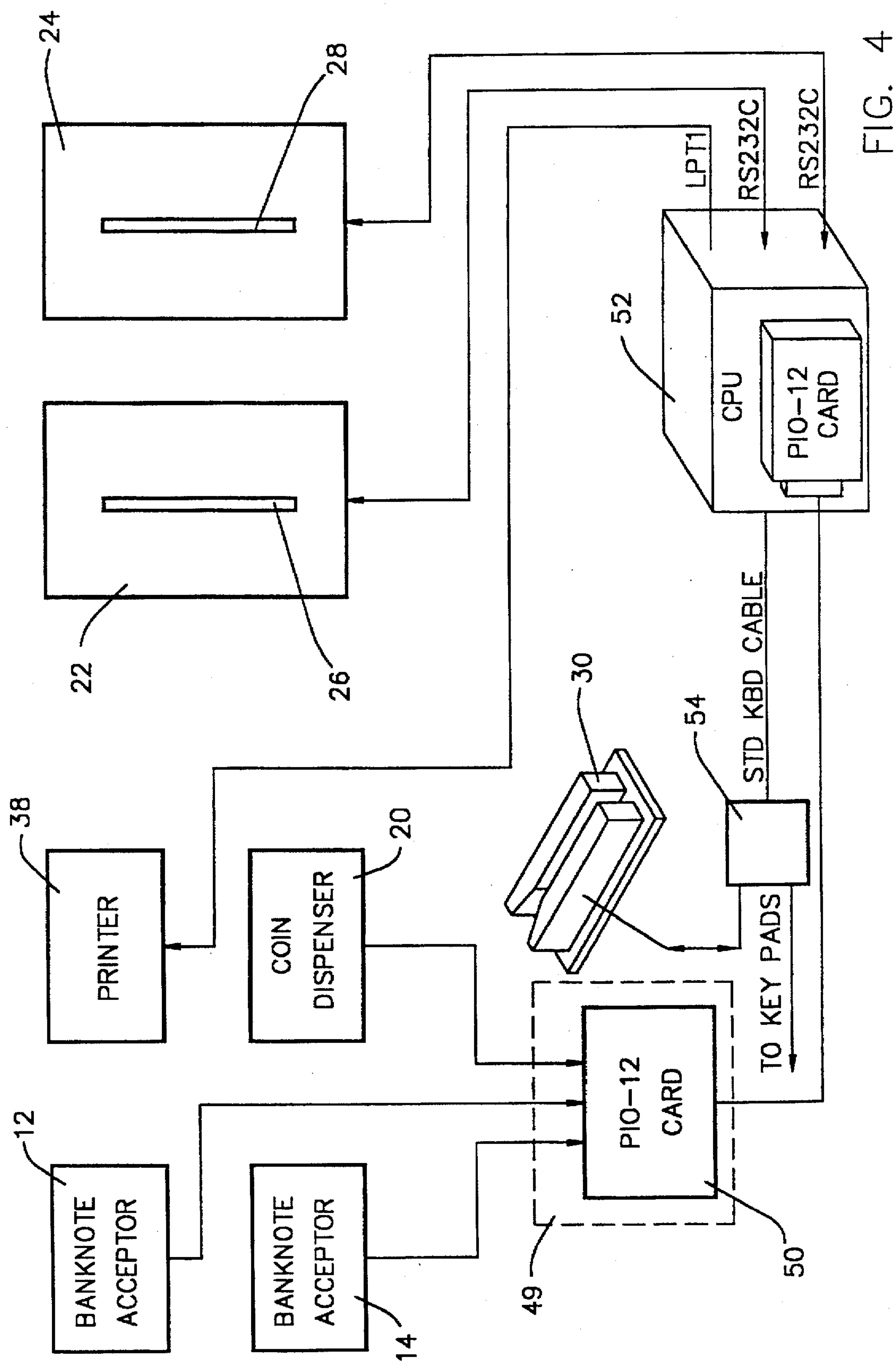
FIG. 4 is a block diagram illustration illustrating the system of FIG. 1.

Reference is now made to FIGS. 1, 3 and 4, which illustrate a simplified pictorial illustration of a roll-on, roll-off financial services center constructed and operative in accordance with a preferred embodiment of the present invention. The financial services center preferably is housed in a standard trolley 10 used in transport applications. For aircraft use, the trolley 10 may be a standard Atlas wheeled trolley which is commercially available from Driessen of Limmen, Holland. The trolley 10 is suitable for roll-on, roll-off loading and unloading onto and from a transport vehicle, such as a train or aircraft.

Disposed within the trolley are at least one and preferably two banknote acceptors 12 and 14, having respective input slots 16 and 18. Typically banknote acceptor 12 is a S2000 Series Note acceptor for United States currency, commercially available from Dixie-Narco, Inc. of Williston, S.C., and banknote acceptor 14 is an Armatic banknote acceptor for non-US currency, commercially available from Armatic Model AL08 of Solna, Sweden.

Also disposed within trolley 10 is a coin dispenser 20, such as a Universal Hopper, commercially available from Coin Controls Limited, of New Coin Street, Royton, Oldham UK. Coin dispenser 20 is provided with a dispensing outlet 21 and typically dispenses coins in only one currency, preferably the currency of the destination of the transport vehicle.

In accordance with a preferred embodiment of the present invention, two banknote dispensers 22 and 24 are provided, having respective dispensing slots 26 and 28. The banknote dispensers 22 and 24 are typically identical and may be 1700 Series Single Denomination Dispensers, commercially available from De La Rue of Inter Innovation 1992 of Havant, Hampshire, U.K.. The two banknote dispensers preferably dispense banknotes in different currencies, for example, a universal currency, such as US dollars and a currency of the destination of the transport vehicle.

In accordance with a preferred embodiment of the present invention, a card reader 30 is provided for reading bank cards or credit cards, in order to enable a traveler to draw money against his credit card or bank account while traveling.

The card reader is typically a MagScan card reader which is commercially available from Barcode Industries of Beltsville, Md., U.S.A. 20705. Alternatively or additionally a smart card reader may be provided.

The following operator interface apparatus is also preferably provided: a display 32, which provides user instructions, menus and messages, a function select keyboard 34, which can be used to select functions and currencies; an alphanumeric keypad 36 which can be used to enter amounts, PIN numbers and other information, and a transaction printer 38, such as an Ap24 miniature impact printer, commercially available from various vendors.

Access to all of the above apparatus may be prevented by locking forward and top cover members 40 and 42 respectively in a closed orientation. The forward cover member 40 is normally dropped down as indicated by arrow 44 during use and the top cover member 42 is normally retracted to a position rearward of the trolley during use of the financial services system of the invention.

As seen in FIG. 4, the bank note acceptors 12 and 14 and the coin dispenser 20 are interconnected via an interface board 49, which is fully described in a net list and parts list appended hereto as Annex A, via an I/O interface card 50, such as a PIO-12 parallel digital interface board, commercially available from Keithley MetraByte Corporation of Taunton, Mass., U.S.A., to a CPU 52, such as an ordinary personal computer.

The keyboard 34, keypad 36 and the card reader 30 are connected to the CPU 52 via a connector circuitry 54. The display 32 is connected to the CPU via a standard display card in the CPU 52.

The printer 38 interfaces with the CPU 52 via an LPT1 port of the CPU and the banknote dispensers 22 and 24 interface with the CPU 52 via RS 232C interface connections. The CPU preferably operates using software, a listing of which is appended hereto as Annex B.

Figure 2:
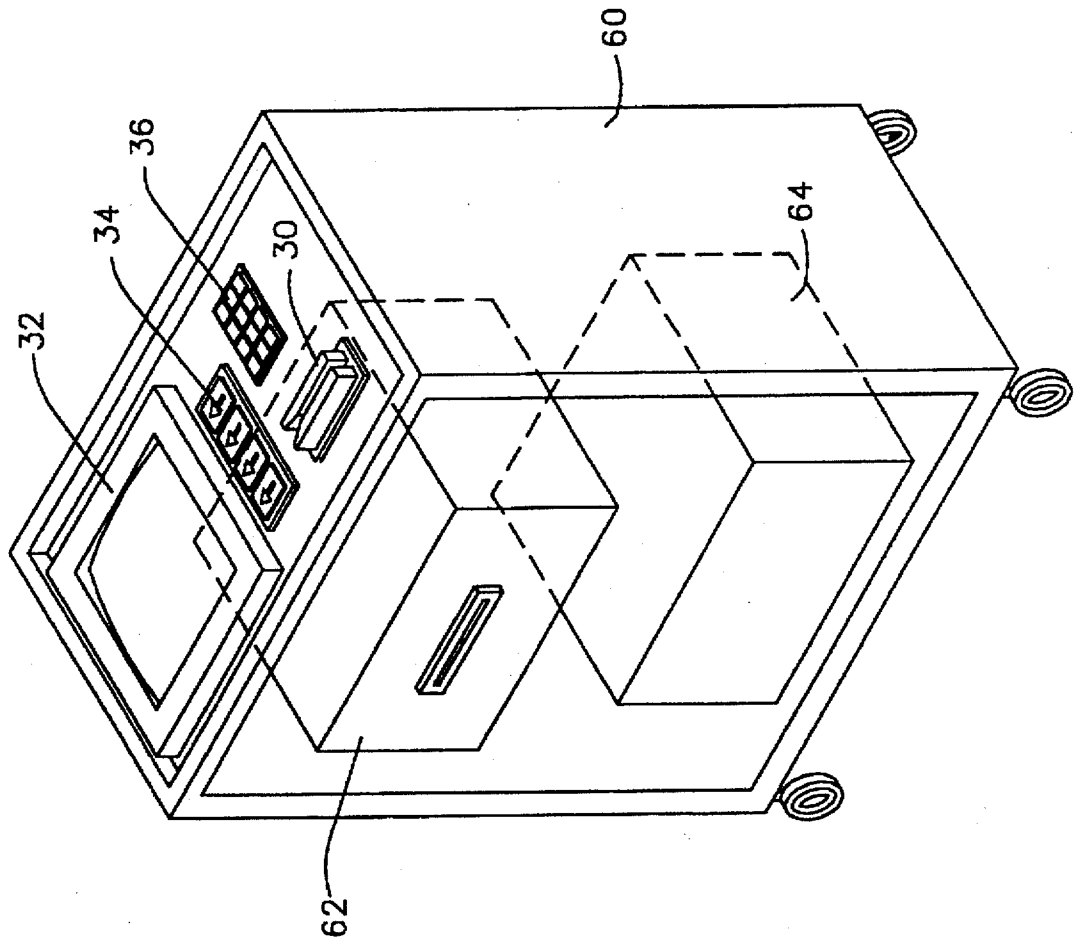
FIG. 2 is a simplified pictorial illustration of a roll-on, roll-off financial services center constructed and operative in accordance with another preferred embodiment of the present invention.

According to an alternative embodiment of the present invention, a smaller version of the apparatus of FIG. 1 may be embodied in a half-size trolley 60, as shown in FIG. 2. Here the Display 32, keyboard 34, keypad 36 and card reader 30 may be identical to those employed in the embodiment of FIG. 1. Only a single banknote dispenser 62 is typically provided in association with a CPU 64, which may be a scaled down version of CPU 52 operating using simpler software based on that in Annex B. It is appreciated that the apparatus of FIG. 2 does not provide currency exchange but rather only drawing cash from a credit card or bank account using a bank card or credit card.

Figure 5:
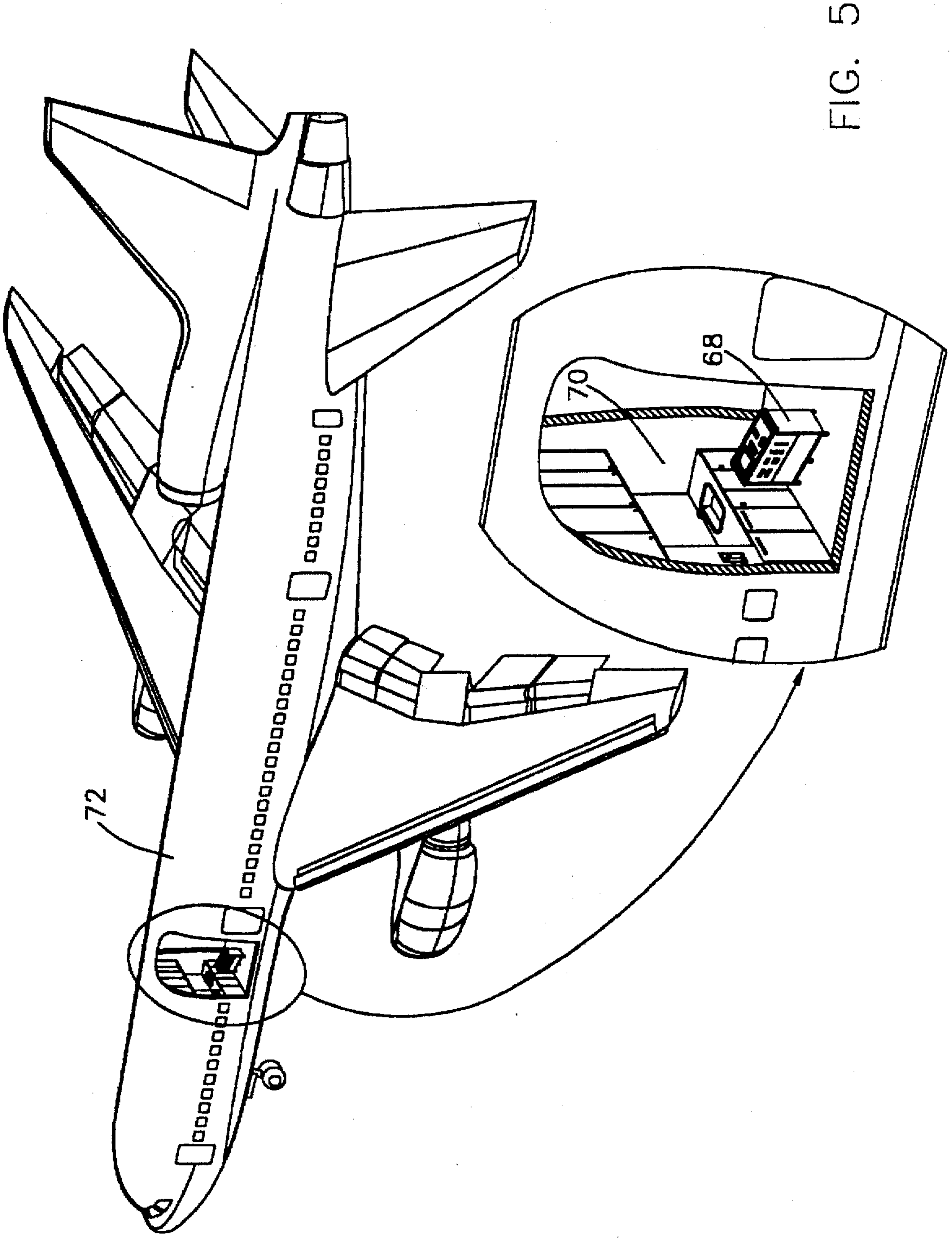
FIG. 5 is a pictorial illustration illustrating the system of FIG. 1 stored in an aircraft galley.

FIG. 5 illustrates a financial services system 68, such as a system of FIG. 1, located in storage in a galley 70 of an aircraft 72. It is appreciated that the system is preferably moved out of the galley when in use. Alternatively, with suitable modifications to the galley, the system may be used when securely stowed in the galley.

It will be appreciated by persons skilled in the art that the present invention is not limited to what has been particularly shown and described hereinabove. Rather the scope of the present invention is defined only by the claims which follow:

Sent by: LIMBACH & LIMBACH 415 956 0994 ; 6 4/97 12:04PM;JetFax #262;Page 3

ANNEX A

Net list, part list and drawing of the card

Sent by: LIMBACH & LIMBACH 415 956 0994 ; 4/97 12:04PM;JetFax #262;Page 4
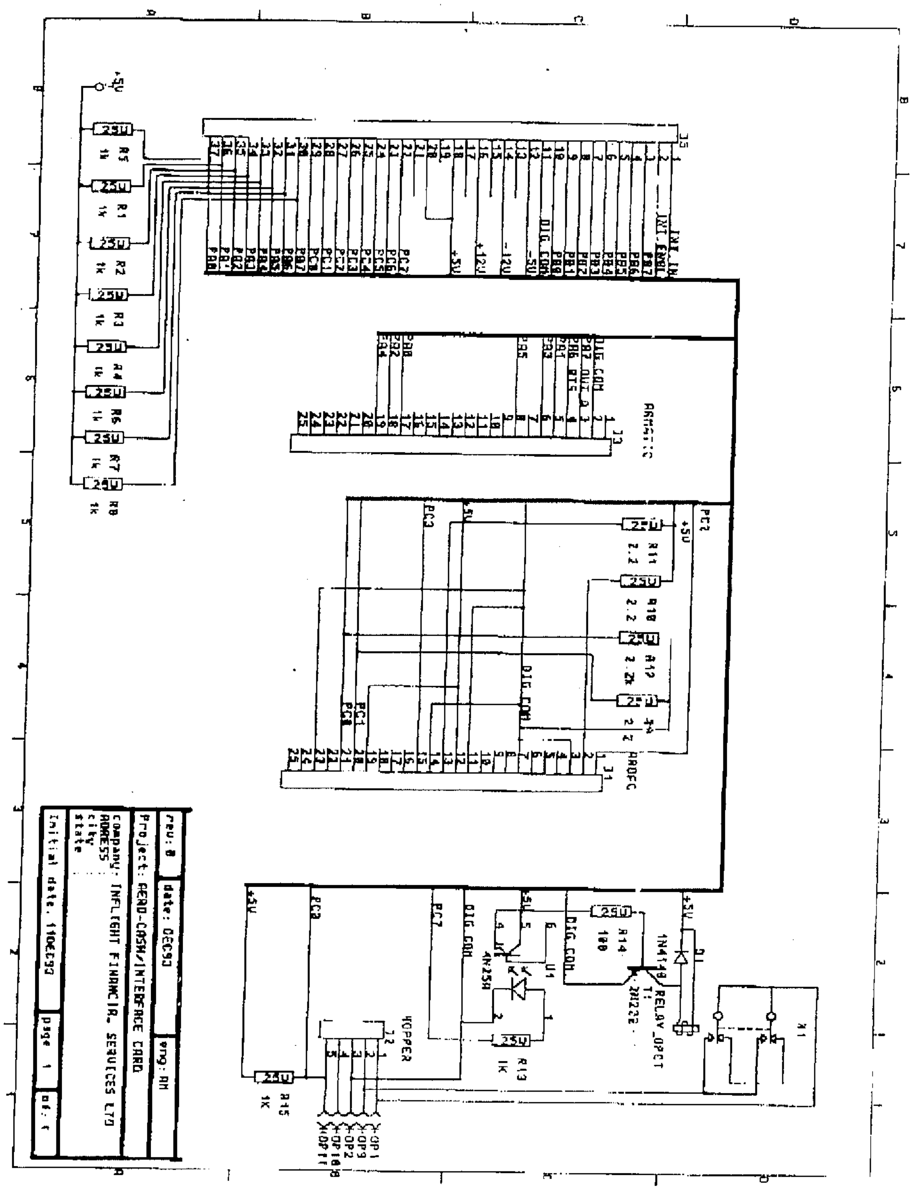

Sent by: LIMBACH & LIMBACH 415 956 0994 ; 04/97 12:05PM;Jetfax #282;Page 5

```
++++ Generated by (ULTIcap) NETLIST V1.33
-3

* DIG.COM
J5-11, J1-23, J1-14, J1-11,
J1-7, J1-3, R12-1, R9-1,
J3-2,

* +5V
J5-20, J5-18, R8-2, R7-2,
R6-2, R5-2, R4-2, R3-2,
R2-2, R1-2, J1-19, J1-12,
R11-1, R10-1, K1-COIL1, D1-C,
U1-5, R15-2,

* PA0
R5-1, J5-37, J3-17,

* PA1
R1-1, J5-36, J3-5,

* PA2
R2-1, J5-35, J3-18,

* PA3
R3-1, J5-34, J3-6,

* PA4
R4-1, J5-33, J3-19,

* PA5
R6-1, J5-32, J3-8,

* PA6
R7-1, J5-31, J3-4,

* PA7
R8-1, J5-30, J3-3,

* PC0
J5-29, R15-1, J2-5,

* PC1
J5-28,

* PC2
J5-27,

* PC3
J5-26,

* PC4
J5-25,

* PC5
J5-24,

* PC6
J5-23,

* PC7
J5-22, R13-2,

* PB1
J5-9, J1-20, R9-2,

* PB2
J5-8, J1-1,

* PB3
```

Sent by: LIMBACH & LIMBACH 415 956 0994 ; J4/97 12:05PM;JetFax #262;Page 6

J5-7, J1-13,

* PB4
J5-6,

* PB5
J5-5,

* PB6
J5-4,

* PB7
J5-3,

* INT.ENBL
J5-2,

* INT.IN
J5-1,

* PB0
J5 10, J1-21, R12-2,

* -5V
J5-12,

* -12V
J5-14,

* +12V
J5-16,

* $$$0000
J5-21,

* $$$0001
J5-17,

* $$$0002
J5-15,

* $$$0003
J 13,

* $$$0004
J1-13, R11-2,

* $$$0005
J1-2, R10-2,

* $$$0006
R14-1, T1-B,

* $$$0007
R14-2, U1-4,

* DIG.COM.
T1-E, U1 2, J2-3,

* $$$0008
U1-1, R13-1,

* HOP9
K1-NO2, K1-NO1, J2-2,

* $$$0009
K1-NC2, K1-NC1,

* HOP1
K1-COMMON2, K1-COMMON1, J2-1,

Sent by: LIMBACH & LIMBACH 415 956 0994 ; )4/97 12:05PM;JetFax #262;Page 7

* HOP10
J2-4,

* $$$0010
D1 A, T1-C,

+++++ END OF LIST +++++

Sent by: LIMBACH & LIMBACH 415 958 0994 ; ι J4/97 12:05PM;JetFax #262;Page 8

```
* VERSION 4 1
J5, DELTA_37HF, D37HF, 0, 0, 270.00, DELTA_37HF;
R1, 1K, RES12, 0, 0, 270.00, RES.25W;
R2, 1K, RES12, 0, 0, 270.00, RES.25W;
R3, 1K, RES12, 0, 0, 270.00, RES.25W;
R4, 1K, RES12, 0, 0, 270.00, RES.25W;
R5, 1K, RES12, 0, 0, 270.00, RES.25W;
R6, 1K, RES12, 0, 0, 270.00, RES.25W;
R7, 1K, RES12, 0, 0, 270.00, RES.25W;
R8, 1K, RES12, 0, 0, 270.00, RES.25W;
R9, 2.2, RES12, 0, 0, 270.00, RES.25W;
R10, 2.2, RES12, 0, 0, 270.00, RES.25W;
R11, 2.2, RES12, 0, 0, 270.00, RES.25W;
R12, 2.2K, RES12, 0, 0, 270.00, RES.25W;
J1, DELTA_25HM, D25HM, 0, 0, 270.00, DELTA_25HM;
J3, DELTA_25HM, D25HM, 0, 0, 270.00, DELTA_25HM;
J2, DIN_5, MAB5S, 0, 0, 270.00, DIN_5;
R13, 1K, RES12, 0, 0, 270.00, RES.25W;
U1, 4N25A, DIP6, 0, 0, 270.00, 4N25A;
T1, 2N222, ?, 0, 0, 270.00, NPN;
D1, 1N4148, DIOD1, 0, 0, 270.00, DIODE;
K  RELAY_DPDT, no_shp, 0, 0, 270.00, RELAY_DPDT;
R.., 100, RES12, 0, 0, 270.00, RES.25W;
R15, 1K, RES12, 0, 0, 270.00, RES.25W;
```

Sent by: LIMBACH & LIMBACH 415 956 0994 ; ι ,4/97 12:05PM;JetFax #262;Page 9

ANNEX B

```
/* ytab.c: IFS parser */


#line 1

#define NL printf("\n")
#define COMMA printf(", ")
#define TAB printf("\t")
#define YYSTYPE int
double xchange();
extern int DONE;
extern int leftnbr;
extern int rightnbr;
extern double total;
extern char cur[];
extern int LANGUAGE;
int yylval;

typedef struct { char *t_name; int t_val; } yytoktype;

#ifndef YYDEBUG
#define YYDEBUG 0 /* allow debugging */
#endif

#if YYDEBUG || YYFULLERR

yytoktype yytoks[] = {
            "'\\n'",        10
           ,"NUM", 257
           ,"ART", 258
           ,"LAN", 259
           ,"END", 260
           ,"-unknown-",    -1
};
char *yyreds[] = {
            "$accept : list $end"
           ,"list :"
           ,"list : list '\\n'"
           ,"list : list poll '\\n'"
           ,"list : list end '\\n'"
           ,"list : list language '\\n'"
           ,"list : list error '\\n'"
           ,"poll : ART"
           ,"language : LAN"
           ,"end : END"
};
#endif /* YYDEBUG */

#define error   256
#define NUM     257
#define ART     258
#define LAN     259
#define END     260

#define yyclearin       yychar=-1
#define yyerrok         yyerrflag=0
#ifndef YYMAXDEPTH
#define YYMAXDEPTH      150
#endif
#ifndef YYSTYPE
#define YYSTYPE         int
#endif
extern YYSTYPE yylval;
YYSTYPE yyval;
```

```
                        {
                                register int yy_i;

                                printf( "Error recovery discards " );
                                if ( yychar == 0 )
                                        printf( "token end-of-file\n"
                                else if ( yychar < 0 )
                                        printf( "token -none-\n" );
                                else
                                {
                                        for ( yy_i = 0;
                                                yytoks[yy_i].t_val >=
                                                yy_i++ )
                                        {
                                                if ( yytoks[yy_i].t_v
                                                        == yychar )
                                                {
                                                        break;
                                                }
                                        }
                                        printf( "token %s\n",
                                                yytoks[yy_i].t_name )
                                }
                        }
#endif /* YYDEBUG */
                        if ( yychar == 0 )      /* reached EOF. quit
                                YYABORT;
                        yychar = -1;
                        goto yy_newstate;
                }
        }/* end if ( yy_n == 0 ) */
        /*
        ** reduction by production yy_n
        ** put stack tops, etc. so things right after switch
        */
#if YYDEBUG
        /*
        ** if debugging, print the string that is the user's
        ** specification of the reduction which is just about
        ** to be done.
        */
        if ( yydebug )
                printf( "Reduce by (%d) \"%s\"\n",
                        yy_n, yyreds[ yy_n ] );
#endif
        yytmp = yy_n;                   /* value to switch over */
        yypvt = yy_pv;                  /* $vars top of value stack *
        /*
        ** Look in goto table for next state
        ** Sorry about using yy_state here as temporary
        ** register variable, but why not, if it works...
        ** If yyr2[ yy_n ] doesn't have the low order bit
        ** set, then there is no action to be done for
        ** this reduction.  So, no saving & unsaving of
        ** registers done.  The only difference between the
        ** code just after the if and the body of the if is
        ** the goto yy_stack in the body.  This way the test
        ** can be made before the choice of what to do is needed.
        */
        {
                /* length of production doubled with extra bit */
                register int yy_len = yyr2[ yy_n ];

                if ( !( yy_len & 01 ) )
```

```
                        {
                                yy_len >>= 1;
                                yyval = ( yy_pv -= yy_len )[1]; /* $$ = $1 */
                                yy_state = yypgo[ yy_n = yyr1[ yy_n ] ] +
                                        *( yy_ps -= yy_len ) + 1;
                                if ( yy_state >= YYLAST ||
                                        yychk[ yy_state =
                                        yyact[ yy_state ] ] != -yy_n )
                                {
                                        yy_state = yyact[ yypgo[ yy_n ] ];
                                }
                                goto yy_stack;
                        }
                        yy_len >>= 1;
                        yyval = ( yy_pv -= yy_len )[1]; /* $$ = $1 */
                        yy_state = yypgo[ yy_n = yyr1[ yy_n ] ] +
                                *( yy_ps -= yy_len ) + 1;
                        if ( yy_state >= YYLAST ||
                                yychk[ yy_state = yyact[ yy_state ] ] != -yy_
                        {
                                yy_state = yyact[ yypgo[ yy_n ] ];
                        }
                }
                                        /* save until reenter driver code */
                yystate = yy_state;
                yyps = yy_ps;
                yypv = yy_pv;
        }
        /*
        ** code supplied by user is placed in this switch
        */
        switch( yytmp )
        {

case 6: {

#line 25
yyerrok;
} break;

case 7: {

#line 27
 if (nomore()) ifserr(1);
                        if (total == 0) screen2();
                        total+=xchange((unsigned char) yylval,cur);
} break;

case 8: {

#line 31
if (!LANGUAGE) {
                         switch(yypvt[0]){
                         case '\u': {LANGUAGE=0; screen1();break;}
                         case '\i': {LANGUAGE=100;screen1();break;}
                         case '\o': {LANGUAGE=0;screen1();break;}
                         case '\p': {LANGUAGE=200;screen1();break;}
                         default: break;
                         }
                         }

} break;

case 9: {
```

```
typedef int yytabelem;
#define YYERRCODE        256

#line 56

#include <stdio.h>
#include <math.h>
#include <conio.h>
void main()
{
        init();
        yyparse();
        fprintf(stderr,"ifs: exit from yyparse()\n");
        exit();
}
yytabelem yydef[] = {
        1, -2, 2, 7, 0, 9, 0, 8, 0, 0,
        0, 3, 4, 5, 6
};
yytabelem yyexca[] = {
        -1, 1,
        0, -1,
        -2, 0
};
yytabelem yyr1[] = {
        0, 3, 3, 3, 3, 3, 3, 2, 1, 4
};
yytabelem yyr2[] = {
        2, 0, 2, 3, 3, 3, 3, 1, 1, 1
};
yytabelem yypgo[] = {
        -1000, 5, 6, 7, 8
};
yytabelem yypact[] = {
        -1000, -10, -1000, -1000, -9, -1000, -8, -1000, -7, -6,
        -1000, -1000, -1000, -1000, -1000
};
yytabelem yychk[] = {
        -1000, -3, 10, 258, -2, 260, -4, 259, -1, 256,
        -1000, 10, 10, 10, 10
};
yytabelem yyact[] = {
        2, 11, 12, 13, 14, 8, 4, 1, 6, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
        0, 0, 0, 0, 0, 0, 0, 0, 0, 0,
```

```
        0, 0, 0, 0, 0, 0, 0, 0, 0, 0,
        0, 0, 0, 0, 0, 0, 0, 0, 0, 0,
        0, 0, 0, 0, 0, 0, 0, 0, 3, 7,
        5
};
#define YYLAST 251

/*
** Skeleton parser driver for yacc output
*/

/*
** yacc user known macros and defines
*/
#define YYERROR         goto yyerrlab
#define YYACCEPT        return(0)
#define YYABORT         return(1)
#define YYBACKUP( newtoken, newvalue )\
{\
        if ( yychar >= 0 || ( yyr2[ yytmp ] >> 1 ) != 1 )\
        {\
                yyerror( "syntax error - cannot backup" );\
                goto yyerrlab;\
        }\
        yychar = newtoken;\
        yystate = *yyps;\
        yylval = newvalue;\
        goto yynewstate;\
}
#define YYRECOVERING()  (!!yyerrflag)
#ifndef YYDEBUG
#       define YYDEBUG  1       /* make debugging available */
#endif

/*
** user known globals
*/
int yydebug;                    /* set to 1 to get debugging */

/*
** driver internal defines
*/
#define YYFLAG          (-1000)

/*
** global variables used by the parser
*/
YYSTYPE yyv[ YYMAXDEPTH ];      /* value stack */
int yys[ YYMAXDEPTH ];          /* state stack */

YYSTYPE *yypv;                  /* top of value stack */
int *yyps;                      /* top of state stack */

int yystate;                    /* current state */
int yytmp;                      /* extra var (lasts between blocks) */

int yynerrs;                    /* number of errors */
int yyerrflag;                  /* error recovery flag */
int yychar;                     /* current input token number */


/*
** yyparse - return 0 if worked, 1 if syntax error not recovered from
```

```
*/
int
yyparse()
{
        register YYSTYPE *yypvt;        /* top of value stack for $vars */

        /*
        ** Initialize externals - yyparse may be called more than once
        */
        yypv = &yyv[-1];
        yyps = &yys[-1];
        yystate = 0;
        yytmp = 0;
        yynerrs = 0;
        yyerrflag = 0;
        yychar = -1;

        goto yystack;
        {
                register YYSTYPE *yy_pv;        /* top of value stack */
                register int *yy_ps;            /* top of state stack */
                register int yy_state;          /* current state */
                register int yy_n;              /* internal state number inf

                /*
                ** get globals into registers.
                ** branch to here only if YYBACKUP was called.
                */
        yynewstate:
                yy_pv = yypv;
                yy_ps = yyps;
                yy_state = yystate;
                goto yy_newstate;

                /*
                ** get globals into registers.
                ** either we just started, or we just finished a reduction
                */
        yystack:
                yy_pv = yypv;
                yy_ps = yyps;
                yy_state = yystate;

                /*
                ** top of for (;;) loop while no reductions done
                */
        yy_stack:
                /*
                ** put a state and value onto the stacks
                */
#if YYDEBUG
                /*
                ** if debugging, look up token value in list of value vs.
                ** name pairs.  0 and negative (-1) are special values.
                ** Note linear search is used since time is not a real
                ** consideration while debugging.
                */
                if ( yydebug )
                {
                        register int yy_i;

                        printf( "State %d, token ", yy_state );
                        if ( yychar == 0 )
                                printf( "end-of-file\n" );
```

Sent by: LIMBACH & LIMBACH 415 956 0994 ; L J4/97 12:06PM;JetFax #282;Page 14

```
                        else if ( yychar < 0 )
                                printf( "-none-\n" );
                        else
                        {
                                for ( yy_i = 0; yytoks[yy_i].t_val >= 0;
                                        yy_i++ )
                                {
                                        if ( yytoks[yy_i].t_val == yychar )
                                                break;
                                }
                                printf( "%s\n", yytoks[yy_i].t_name );
                        }
                }
#endif /* YYDEBUG */
                if ( ++yy_ps >= &yys[ YYMAXDEPTH ] )    /* room on stack? */
                {
                        yyerror( "yacc stack overflow" );
                        YYABORT;
                }
                *yy_ps = yy_state;
                *++yy_pv = yyval;

                /*
                ** we have a new state - find out what to do
                */
        yy_newstate:
                if ( ( yy_n = yypact[ yy_state ] ) <= YYFLAG )
                        goto yydefault;         /* simple state */
#if YYDEBUG
                /*
                ** if debugging, need to mark whether new token grabbed
                */
                yytmp = yychar < 0;
#endif
                if ( ( yychar < 0 ) && ( ( yychar = yylex() ) < 0 ) )
                        yychar = 0;             /* reached EOF */
#if YYDEBUG
                if ( yydebug && yytmp )
                {
                        register int yy_i;

                        printf( "Received token " );
                        if ( yychar == 0 )
                                printf( "end-of-file\n" );
                        else if ( yychar < 0 )
                                printf( "-none-\n" );
                        else
                        {
                                for ( yy_i = 0; yytoks[yy_i].t_val >= 0;
                                        yy_i++ )
                                {
                                        if ( yytoks[yy_i].t_val == yychar )
                                                break;
                                }
                                printf( "%s\n", yytoks[yy_i].t_name );
                        }
                }
#endif /* YYDEBUG */
                if ( ( ( yy_n += yychar ) < 0 ) || ( yy_n >= YYLAST ) )
                        goto yydefault;
                if ( yychk[ yy_n = yyact[ yy_n ] ] == yychar )  /*valid shift
                {
                        yychar = -1;
                        yyval = yylval;
```

Sent by: LIMBACH & LIMBACH 415 956 0994 ; ( )4/97 12:06PM;JetFax #262;Page 15

```
                    yy_state = yy_n;
                    if ( yyerrflag > 0 )
                            yyerrflag--;
                    goto yy_stack;
            }

        yydefault:
            if ( ( yy_n = yydef[ yy_state ] ) == -2 )
            {
#if YYDEBUG
                    yytmp = yychar < 0;
#endif
                    if ( ( yychar < 0 ) && ( ( yychar = yylex() ) < 0 ) )
                            yychar = 0;             /* reached EOF */
#if YYDEBUG
                    if ( yydebug && yytmp )
                    {
                            register int yy_i;

                            printf( "Received token " );
                            if ( yychar == 0 )
                                    printf( "end-of-file\n" );
                            else if ( yychar < 0 )
                                    printf( "-none-\n" );
                            else
                            {
                                    for ( yy_i = 0;
                                            yytoks[yy_i].t_val >= 0;
                                            yy_i++ )
                                    {
                                            if ( yytoks[yy_i].t_val
                                                    == yychar )
                                            {
                                                    break;
                                            }
                                    }
                                    printf( "%s\n", yytoks[yy_i].t_name )
                            }
                    }
#endif /* YYDEBUG */
                    /*
                    ** look through exception table
                    */
                    {
                            register int *yyxi = yyexca;

                            while ( ( *yyxi != -1 ) ||
                                    ( yyxi[1] != yy_state ) )
                            {
                                    yyxi += 2;
                            }
                            while ( ( *(yyxi += 2) >= 0 ) &&
                                    ( *yyxi != yychar ) )
                                    ;
                            if ( ( yy_n = yyxi[1] ) < 0 )
                                    YYACCEPT;
                    }
            }

            /*
            ** check for syntax error
            */
            if ( yy_n == 0 )        /* have an error */
            {
```

Sent by: LIMBACH & LIMBACH 415 956 0994 ; 0 1/97 12:07PM;JetFax #262;Page 16/42

```
                /* no worry about speed here! */
                switch ( yyerrflag )
                {
                case 0:         /* new error */
                        yyerror( "syntax error" );
                        goto skip_init;
                yyerrlab:
                        /*
                        ** get globals into registers.
                        ** we have a user generated syntax type error
                        */
                        yy_pv = yypv;
                        yy_ps = yyps;
                        yy_state = yystate;
                        yynerrs++;
                skip_init:
                case 1:
                case 2:         /* incompletely recovered error */
                                /* try again... */
                        yyerrflag = 3;
                        /*
                        ** find state where "error" is a legal
                        ** shift action
                        */
                        while ( yy_ps >= yys )
                        {
                                yy_n = yypact[ *yy_ps ] + YYERRCODE;
                                if ( yy_n >= 0 && yy_n < YYLAST &&
                                        yychk[yyact[yy_n]] == YYERRCO
                                        /*
                                        ** simulate shift of "error"
                                        */
                                        yy_state = yyact[ yy_n ];
                                        goto yy_stack;
                                }
                                /*
                                ** current state has no shift on
                                ** "error", pop stack
                                */
#if YYDEBUG
#       define _POP_ "Error recovery pops state %d, uncovers state %d\n"
                                if ( yydebug )
                                        printf( _POP_, *yy_ps,
                                                yy_ps[-1] );
#       undef _POP_
#endif

                                yy_ps--;
                                yy_pv--;
                        }
                        /*
                        ** there is no state on stack with "error" as
                        ** a valid shift.  give up.
                        */
                        YYABORT;
                case 3:         /* no shift yet; eat a token */
#if YYDEBUG

                        /*
                        ** if debugging, look up token in list of
                        ** pairs.  0 and negative shouldn't occur,
                        ** but since timing doesn't matter when
                        ** debugging, it doesn't hurt to leave the
                        ** tests here.
                        */
                        if ( yydebug )
```

Sent by: LIMBACH & LIMBACH 415 956 0994 ; 04/97 12:07PM;JetFax #262;Page 17/42

```
                        {
                                register int yy_i;

                                printf( "Error recovery discards " );
                                if ( yychar == 0 )
                                        printf( "token end-of-file\n"
                                else if ( yychar < 0 )
                                        printf( "token -none-\n" );
                                else
                                {
                                        for ( yy_i = 0;
                                                yytoks[yy_i].t_val >=
                                                yy_i++ )
                                        {
                                                if ( yytoks[yy_i].t_v
                                                        == yychar )
                                                {
                                                        break;
                                                }
                                        }
                                        printf( "token %s\n",
                                                yytoks[yy_i].t_name )
                                }
                        }
#endif /* YYDEBUG */
                        if ( yychar == 0 )      /* reached EOF. quit
                                YYABORT;
                        yychar = -1;
                        goto yy_newstate;
                }
        }/* end if ( yy_n == 0 ) */
        /*
        ** reduction by production yy_n
        ** put stack tops, etc. so things right after switch
        */
#if YYDEBUG
        /*
        ** if debugging, print the string that is the user's
        ** specification of the reduction which is just about
        ** to be done.
        */
        if ( yydebug )
                printf( "Reduce by (%d) \"%s\"\n",
                        yy_n, yyreds[ yy_n ] );
#endif
        yytmp = yy_n;                   /* value to switch over */
        yypvt = yy_pv;                  /* $vars top of value stack *
        /*
        ** Look in goto table for next state
        ** Sorry about using yy_state here as temporary
        ** register variable, but why not, if it works...
        ** If yyr2[ yy_n ] doesn't have the low order bit
        ** set, then there is no action to be done for
        ** this reduction.  So, no saving & unsaving of
        ** registers done.  The only difference between the
        ** code just after the if and the body of the if is
        ** the goto yy_stack in the body.  This way the test
        ** can be made before the choice of what to do is needed.
        */
        {
                /* length of production doubled with extra bit */
                register int yy_len = yyr2[ yy_n ];

                if ( !( yy_len & 01 ) )
```

```
                        {
                                yy_len >>= 1;
                                yyval = ( yy_pv -= yy_len )[1]; /* $$ = $1 */
                                yy_state = yypgo[ yy_n = yyr1[ yy_n ] ] +
                                        *( yy_ps -= yy_len ) + 1;
                                if ( yy_state >= YYLAST ||
                                        yychk[ yy_state =
                                        yyact[ yy_state ] ] != -yy_n )
                                {
                                        yy_state = yyact[ yypgo[ yy_n ] ];
                                }
                                goto yy_stack;
                        }
                        yy_len >>= 1;
                        yyval = ( yy_pv -= yy_len )[1]; /* $$ = $1 */
                        yy_state = yypgo[ yy_n = yyr1[ yy_n ] ] +
                                *( yy_ps -= yy_len ) + 1;
                        if ( yy_state >= YYLAST ||
                                yychk[ yy_state = yyact[ yy_state ] ] != -yy_
                        {
                                yy_state = yyact[ yypgo[ yy_n ] ];
                        }
                }
                                        /* save until reenter driver code */
                yystate = yy_state;
                yyps = yy_ps;
                yypv = yy_pv;
        }
        /*
        ** code supplied by user is placed in this switch
        */
        switch( yytmp )
        {

case 6: {

#line 25
yyerrok;
} break;

case 7: {

#line 27
 if (nomore()) ifserr(1);
                        if (total == 0) screen2();
                        total+=xchange((unsigned char) yylval,cur);
} break;

case 8: {

#line 31
if (!LANGUAGE) {
                         switch(yypvt[0]){
                         case '\u': {LANGUAGE=0; screen1();break;}
                         case '\i': {LANGUAGE=100;screen1();break;}
                         case '\o': {LANGUAGE=0;screen1();break;}
                         case '\p': {LANGUAGE=200;screen1();break;}
                         default: break;
                         }
                         }

} break;

case 9: {
```

```
#line 42
    if (total) {
                    NL;TAB;
                    mprintf(6);
                    cprintf(" = %.2f %s\n",total,&cur[0]);
                    window(1,24,40,25); clrscr();
                    NL;TAB; mprintf(7);COMMA;mprintf(8);NL;TAB;mprintf(12
                    eroga(total);
                    total=0;
                    LANGUAGE=0;
                    screen0();
                }

} break;

        }
        goto yystack;           /* reset registers in driver code */
}
```

Sent by: LIMBACH & LIMBACH 415 956 0994 ; 0 )4/97 12:07PM;JetFax #262;Page 20/42

```
/* ifslex.c : lexical analizer with armatic & ardac polling functions */

#include <stdio.h>
#include <ctype.h>
#include "ytab.h"
#include "ifspoll.h"
#define DEBOUNCE 5
extern int yylval;
int artflag=0;

yylex()
{
        int c;
        unsigned char art(), ard();
        static int THISFLAG;
        for(;;) {
        delay(200);
        if (THISFLAG) {
                THISFLAG=0;
                return '\n';
        }
        yylval= art();
        if (yylval >0) {
                THISFLAG=1;
                return ART;
        }
        yylval= ard();
        if (yylval > 0) {
                THISFLAG=1;
                return ART; /* same as for Armatic */
        }
        if (kbhit())  {
                THISFLAG=1;
                if ((c=getch()) == '\n')
                        return '\n';
                if (c == ' ' || c == '\t')
                        return '\n';
                if (c=='h')
                        return END;
                if ((c=='\u') || (c=='\i') || (c=='\o') || (c=='\p'))  {
                        yylval=c;
                        return LAN;
                }
                }
        }
}
unsigned char art()
{
        unsigned char p;
        int i=0;
           //  delay(300);
      for(;;) {
        p=inp(ARMATIC);
        if ((p<128) && (p>=64)) {
          if (i<1000) i++;
          if (i==1) { /*  printf("ARMATIC: %d\n", p&63);  */
                return (p&63);
          }
        }
        if (p==128) {
         i=0;
         return(0);
        }
      }
```

```
}
unsigned char ard()
{
        unsigned char p, pp;
        int i,c;

    //  delay(275);
        p=inp(ARDAC);

        switch(p&0xF) {
        case 15: {
                delay(DEBOUNCE);
                p=inp(ARDAC);
                delay(DEBOUNCE);
                p=inp(ARDAC);
                if ((p&0xF) == 15) return 51;  /* 1$ as in ifschng.h */
                }
                break;
        case 13: {
                delay(DEBOUNCE);
                p=inp(ARDAC);
                delay(DEBOUNCE);
                p=inp(ARDAC);
                if ((p&0xF) == 13) return 52; /* 5$ as in ifschng.h */
                }
                break;
        case 3 : {
                delay(DEBOUNCE);
                p=inp(ARDAC);
                delay(DEBOUNCE);
                p=inp(ARDAC);
                if ((p&0xF) == 3) return 53; /* 10$ as in ifschng.h */
                }
                break;
        case 1 : {
                delay(DEBOUNCE);
                p=inp(ARDAC);
                delay(DEBOUNCE);
                p=inp(ARDAC);
                if ((p&0xF) == 1) return 54; /* 20$ as in ifschng.h */
                }
                break;
        default: return 0;
        }
        return 0;
}
```

```
/* ifsinit.c: init() inizilizza il sistema, usa variabili globali */

#include <stdio.h>
#include <string.h>
#include <time.h>
#include <conio.h>

/* variabili globali */
char FLIGHT[25];  /* esempio: ELAL123 */
double LEFTNOTE; /* esempio: 20 */
double RIGHTNOTE; /* esempio: 5 */
float COINVALUE; /* esempio: .25 */
char cur[10]; /* valuta eroganda */
int leftnbr, rightnbr, coinnbr;
double maxchng;
double total; /* cambio erogando */
int LANGUAGE=0; // GB 0, FR 100, IT 200
int can_chng_LANG=1;
struct partial {
  char s[2+1];
  double tot;
} partials[25]; /* totali parziali */
char language[20]; /* for msgs */
FILE *buf;

void init()
{
        int i;
        char *strcpy(), *s, dummy[25];
        FILE *fp, *fopen();
        time_t t;

        /* apre A:IFSINIT.TXT */
        if ((fp=fopen("ifsinit.txt","r")) == 0) {
                fprintf(stderr,"ifsinit.c: cannot open A:IFSINIT.TXT\n");
                exit(1);
        }

        /* definisce volo */
        fscanf(fp,"%s%s",dummy,FLIGHT);
        /* definisce valuta eroganda */
        fscanf(fp,"%s%s",dummy,cur);

        /* definisce banconote */
        fscanf(fp,"%s%d",dummy,&LEFTNOTE);
        fscanf(fp,"%s%d",dummy,&RIGHTNOTE);

        /* definisce valore moneta */
        fscanf(fp,"%s%f",dummy,&COINVALUE);

        /*inizializza quantita' banconote e monete */
        fscanf(fp,"%s%d",dummy,&leftnbr);
        fscanf(fp,"%s%d",dummy,&rightnbr);
        fscanf(fp,"%s%d",dummy,&coinnbr);

        /* chiude A:IFSINIT.TXT */
        close(fp);

        /* apre IFS.LOG */
        if ((fp=fopen("ifs.log","at")) == NULL) {
                fprintf(stderr,"ifsinit.c: cannot append to IFS.LOG\n");
                exit(1);
        }
        fprintf(fp,"====================================\n");
```

Sent by: LIMBACH & LIMBACH 415 956 0994 ; C J4/97 12:08PM;JetFax #262;Page 23/42

```
        fprintf(fp,"%s %s %d %d %f %d %d %d\n",FLIGHT, cur, LEFTNOTE, RIGHTNO
        tempo(fp);
        fclose(fp);

        /* definisce massimo cambio */
        maxchng = 10 * LEFTNOTE;

        /* azzera il totale da erogare */
        total=0;

        /* azzera i totali parziali */
        for (i=0;i<25;i++) {
                partials[i].tot=0;strcpy(partials[i].s, (char *) 0);}

        /* messaggio d'introduzione */
        textmode(BW40);
        _setcursortype(_NOCURSOR);
        screen0();
}
tempo(FILE *fp)
{
        time_t t;

        time(&t);
        fprintf(fp,"%s\n", ctime(&t));
        return(0);
}
```

Sent by: LIMBACH & LIMBACH 415 956 0994 ; 0-..04/97 12:08PM;JetFax #262;Page 24/42

```
                /* ifschange.c : returns change of input banknote in output
   30 SEP 93
*/
#include "ifschng.h"
#include <stdio.h>
#include <string.h>
#include <sys/types.h>
#include <stdlib.h>
#include <time.h>
double xchange(unsigned char code, char *to_currency)
{
        double change;
        struct armatic *armp;
        struct rates *ratp;
        char *strcpy();
        FILE *fp, *fopen();

        /* lookup denomination and value of input banknote */
        armp = &armatic[0];
        while (armp->code != code) {
                if (armp->code == 0) {
                fprintf(stderr,"\nifschng.c: change, armatic[]: out of range\
                        exit(1);
                        }
                armp++;
        }

        /* lookup rate to output currency */
        ratp = &rates[0];
        while (ratp->rate != (double) 0) {
                if (strcmp(armp->currency,to_currency) == 0) {
                        ratp->rate = 1.0;
                        break;
                }
                if ((strcmp(ratp->in_currency,armp->currency) == 0) && (strcm
                        break;
                } else {
                  ratp++;
                  if (ratp->rate == (double) 0) {
                     fprintf(stderr,"\nifschng.c: change, rates[]: out of ran
                     exit(1);
                  }
                 }
        }

        /* here the actual conversion is made */
        change = armp->value * ratp->rate;
        if ((fp=fopen("ifs.log","a")) == NULL) {
                fprintf(stderr,"ifschng.c: cannot append to IFS.LOG\n");
                exit(1);
        }
        if (strcmp(to_currency,"itl") == NULL) {
                cprintf("%7g %s = %7g %s rate: %-7g\n\r",armp->value,armp->cu
                fprintf(fp,"%8g %s = %8g %s exchange rate: %-8g\n",armp->valu
        } else {
                cprintf("%7g %s = %7.2f %s %-7g\n\r",armp->value,armp->curren
                fprintf(fp,"%8g %s = %8.2f %s exchange rate: %-8g\n",armp->va
        }
        tempo(fp);
        fclose(fp);
        return(change);
}
```

Sent by: LIMBACH & LIMBACH 415 956 0994 ; 0 04/97 12:08PM;JetFax #262;Page 25/42

```
/* ifsout.c: eroga biglietti di banca e coins */

#include <stdio.h>
#define LEFT 1
#define RIGHT 2

void eroga(double amount)
{
        int i;
        double resto; /* valore in valuta emiss. della moneta */
        extern float COINVALUE; /* in ifsinit.c */
        extern int LEFTNOTE, RIGHTNOTE; /* cassetti Delarue */
        extern int leftnbr; /* in ifsinit.c */
        extern int rightnbr;/* in ifsinit.c */

        if(amount<COINVALUE) {
          fprintf(stderr,"ifsout.c: amount less than COINVALUE\n");
          exit(1);
        }

        if (amount >= LEFTNOTE) {
          resto = amount / LEFTNOTE;
          for(i=1;i<resto;i++) {
            ifsrue(1,LEFT);
//printf("LEFT: 1 note\n");
            leftnbr--;
          }
          amount -= LEFTNOTE * --i;
        }
        if (amount >= RIGHTNOTE) {
          resto = amount / RIGHTNOTE;
          for(i=1;i<resto;i++) {
            ifsrue(1,RIGHT);
// printf("RIGHT: 1 note\n");
            rightnbr--;
          }
          amount -= RIGHTNOTE * --i;
        }

        if (amount >= COINVALUE) {
          resto = amount / COINVALUE;
          for(i=1;i<resto;i++) {
     //     ifshop(1);
// printf("+1 coins\b\b\b\b\b");
     //     coinnbr--;
          }
          amount -= COINVALUE * --i;
// printf("\nremainder: %f\n",amount);
        }

}
```

Sent by: LIMBACH & LIMBACH 415 956 0994 ; 6 04/97 12:09PM;JetFax #262;Page 26/42

```
/* ifsmsg.c : invia un messaggio in struct msg in ifsmsg.h a stdout */

#include <stdio.h>
#include <string.h>
#include "ifsmsg.h"

mprintf(int n)
{
        char s[255], *strcpy();
        struct msg *m;
        extern int LANGUAGE; /* in ifsinit.c */
        m=msg;

        while (m->n != NULL) {
          if (m->n==n+LANGUAGE) {
            strcpy(s,m->m);
            cprintf("%s",s);
          }
          if (m->n==0) {
            fprintf(stderr,"ifsmsg.c: struct msg out of range\n");
            return 1;
          }
          m++;
         }
        return 0;
}
```

```
#include <conio.h>
void screen0()
{
        window(1,1,40,25);
        clrscr();
        window(15,1,40,1);
        mprintf(2); //("WELCOME TO");
        window(4,2,40,2);
        cprintf("INFLIGHT FINANCIAL SERVICES Ltd.");
        window(20,8,40,8);
        cprintf("DEUTCH ............");
        window(20,12,40,12);
        cprintf("FRANCAIS ..........");
        window(20,15,40,20);
        cprintf("HEBREW ............");
        window(20,19,40,19);
        cprintf("ITALIANO ..........");
        window(3,22,40,22);
        mprintf(3);
        window(7,23,40,23);
        mprintf(4);
        window(1,5,4,5);
        cprintf("NIS");
        window(5,5,40,6);
        mprintf(5); // ("RATES     5/12/93      EL-AL 123\n\r");
/*      time(&t);
        cprintf("  %s\n\r", ctime(&t));
  */

        window(1,7,19,22);
        cprintf("USD 2.98\n\r");
        cprintf("ATS 0.248\n\r");
        cprintf("BEF 0.084\n\r");
        cprintf("CAD 2.22\n\r");
        cprintf("CHF 2.05\n\r");
        cprintf("DEM 1.74\n\r");
        cprintf("DKK 0.45\n\r");
        cprintf("ESB 0.0213\n\r");
        cprintf("FRF 0.51\n\r");
        cprintf("GBP 4.43\n\r");
        cprintf("ITL 0.00178\n\r");
        cprintf("JPY 0.0268\n\r");
        cprintf("NLG 1.56\n\r");
        cprintf("SEK 0.36\n\r");

}
void screen1()
{
        window(1,1,40,25);
        clrscr();
        window(15,1,40,1);
        mprintf(2); //("WELCOME TO");
        window(4,2,40,2);
        cprintf("INFLIGHT FINANCIAL SERVICES Ltd.");
        window(3,22,40,22);
        mprintf(3);
        window(7,23,40,23);
        mprintf(4);
        window(1,5,4,5);
        cprintf("NIS");
        window(5,5,40,6);
        mprintf(5); // ("RATES     5/12/93      EL-AL 123\n\r");
/*      time(&t);
        cprintf("  %s\n\r", ctime(&t));
```

```
 */
        window(1,7,19,22);
        cprintf("USD 2.98\n\r");
        cprintf("ATS 0.248\n\r");
        cprintf("BEF 0.084\n\r");
        cprintf("CAD 2.22\n\r");
        cprintf("CHF 2.05\n\r");
        cprintf("DEM 1.74\n\r");
        cprintf("DKK 0.45\n\r");
        cprintf("ESB 0.0213\n\r");
        cprintf("FRF 0.51\n\r");
        cprintf("GBP 4.43\n\r");
        cprintf("ITL 0.00178\n\r");
        cprintf("JPY 0.0268\n\r");
        cprintf("NLG 1.56\n\r");
        cprintf("SEK 0.36\n\r");


}
void screen2()
{
        window(1,5,40,25);
        clrscr();
        window(21,24,40,24);
        mprintf(10); //("PUSH GREEN TO");
        window(29,25,40,25);
        mprintf(11); //("END");
        window(27,5,40,5);
        mprintf(9); //("XCHNG RATE");
        window(1,7,40,23);
        clrscr();
}
```

```
/* ifsrue.c: funzioni per macchine Delarue in modo seriale via RS232C */

#include <bios.h>
#include <conio.h>
#include <stdio.h>
#define DATA_READY 0x100
#define SETS 0
#define SENDS 1
#define RECEIVES 2
#define RETURNS 3
#define SET9600 (0xE0 | 0x18 | 0x02 |0x00) /* 9600, E, 7, 1 */
#define SET4800 (0xC0 | 0x18 | 0x02 |0x00) /* 4800, E, 7, 1 */
#define ACK 0x06
#define NACK 0x15
#define EOT 0x04
#define ID 0x30
#define STX 0x02
#define ETX 0x03
#define LENGTH 0x38
#define BCC 0x3F
#define DELAY 100
#define TIMEOUT 100
#define GOOD 0x02

int ifsrue(int count, int rue)
{
        int i,j,out;

        for (i=0;i<count;i++) {

            for (j=0;j<TIMEOUT;j++) {
            out=rueStatus(rue);
            if ((out & GOOD)==0) break;
          }
        if (j>=TIMEOUT) {
          fprintf(stderr,"ifsrue.c : TIMEOUT\n");
          return(1);
        }
        out=rueSingNote(rue);
        }
        return(0);
}
rueStatus(int machine)
{
                int i, n, out;
                int status=0, ct1=0,ct2=0;
                int DONE=0;
                delay(DELAY);
                bioscom(SETS ,SET4800, machine);
                /* HOST transmit command */
                bioscom(SENDS, EOT, machine); /* EOT */
                bioscom(SENDS, ID, machine); /* ID */
                bioscom(SENDS, STX, machine); /* STX */
                bioscom(SENDS, 0x40, machine); /* Status cmd */
                bioscom(SENDS, ETX, machine); /* ETX */
                bioscom(SENDS, 0x75, machine); /* BCC */

                /* Host test for ACK */
                DONE=0;
                while (!DONE){
                  if ((bioscom(RETURNS,0,machine)) & DATA_READY)
                    if((out=bioscom(RECEIVES,0,machine) & 0x7F) != 0){
                      if (out== ACK) DONE=1;
                    }
```

```
            }

            /* DISPENSER transmit response */
            DONE=0;
            ct1=0;
            ct2=0;
            while (!DONE){
              if ((bioscom(RETURNS,0,machine)) & DATA_READY)
                if((out=bioscom(RECEIVES,0,machine) & 0x7F) != 0) {
                    if (ct2==1) DONE=1;
                    if (ct1==1) {status=out;ct1++;}
                    if (out==0x40) ct1++;
                    if (out==ETX) ct2++;
                }
            }
            /* HOST accept response by transmitting ACK */
            bioscom(SENDS,ACK,machine); /* ACK */

            /* DISPENSER transmit EOT */
            /*
            DONE=0;
            while (!DONE) {
              if ((bioscom(RETURNS,0,machine)) & DATA_READY)
                if((out=bioscom(RECEIVES,0,machine) & 0x7F) != 0)
                  if (out==EOT) DONE=1;
            */
                    return status;

}
rueSingNote(int machine)
{
            int i, n, out;
            int DONE=0;
            delay(DELAY);
            bioscom(SETS ,SET4800, machine);
            /* HOST transmit command */
            bioscom(SENDS, 0x04, machine); /* EOT */
            bioscom(SENDS, 0x30, machine); /* ID */
            bioscom(SENDS, 0x02, machine); /* STX */
            bioscom(SENDS, 0x4A, machine); /* SNDC */
            bioscom(SENDS, 0x1C, machine); /* FS */
            bioscom(SENDS, 0x34, machine); /* TIME */
            bioscom(SENDS, 0x50, machine); /* set  */
            bioscom(SENDS, LENGTH, machine); /* PROTRUSION */
            bioscom(SENDS, 0x03, machine); /* ETX */
            bioscom(SENDS, BCC, machine); /* BCC */

            /* Host test for ACK */
            DONE=0;
            while (!DONE){
              if ((bioscom(RETURNS,0,machine)) & DATA_READY)
                if((out=bioscom(RECEIVES,0,machine) & 0x7F) != 0)
                  if (out== ACK) DONE=1;
            }

            /* DISPENSER transmit response */
            DONE=0;
            while (!DONE){
              if ((bioscom(RETURNS,0,machine)) & DATA_READY)
                if((out=bioscom(RECEIVES,0,machine) & 0x7F) != 0)
                  if (out==ETX) DONE=1;
            }
            /* HOST accept response by transmitting ACK after DELAY*/
            bioscom(SENDS,ACK,machine); /* ACK */
```

Sent by: LIMBACH & LIMBACH 415 956 0994 ; L J4/97 12:10PM; JetFax #262;Page 31/42

```
        /* DISPENSER transmit EOT after DELAY */
        DONE=0;
        while (!DONE) {
         if ((bioscom(RETURNS,0,machine)) & DATA_READY)
           if((out=bioscom(RECEIVES,0,machine) &~0x7F) != 0)
             if (out==EOT) DONE=1;
             return 1;
        }
        return 0;
}
```

```
/* ifsnomor.c: to check availability of notes */

nomore()
{
        extern int leftnbr;
        extern int rightnbr;
        extern double maxchng;
        extern double LEFTNOTE, RIGHTNOTE;
        if (maxchng > (LEFTNOTE * leftnbr + RIGHTNOTE * rightnbr)) return 1;
        return 0;
}
```

Sent by: LIMBACH & LIMBACH 415 956 0994 ; 6 04/97 12:10PM;JetFax #282;Page 33/42

```
/* ifserr.c : invia un messaggio in struct err in ifserr.h a stderr */

#include <stdio.h>
#include <string.h>
#include "ifserr.h"

ifserr(int n)
{
        char s[255], *strcpy();
        struct err *m;

        m=&err[0];

        while (m->n != NULL) {
          if (m->n==n) {
            strcpy(s,m->m);
            printf("%s\n",s);
          }
          if (m->n==0) {
            fprintf(stderr,"ifserr.c: struct err out of range\n");
            return 1;
          }
          m++;
         }
        return 0;
}
```

Sent by: LIMBACH & LIMBACH 415 956 0994 ; 0· ·/97 12:10PM;JetFax #262;Page 34/42

```
void yyerror(){;}
void yywrap(){;}
void err_msg(unsigned char c)
{
        switch (c) {
        case 1:
                printf("Insufficient number of banknotes\n");
                exit(1);
        default:
                exit(1);
        }
}
```

```
/* ifspoll.h: header file for ifspoll.c */
#define ARMATIC 768
#define ARDAC 769
```

```
#define FLIGHT El_Al_123
#define LANGUAGE "english"
#define CURRENCY "usd"
#define COIN isr
#define COINVALUE 500
#define LEFT 2  /* left Delarue box comport */
#define RIGHT 1 /* right Delarue box comport */
#define LEFTNOTE 5
#define RIGHTNOTE 20
#define LEFTNBR 40
#define RIGHTNBR 40
#define MAXCHNG 500
```

```
struct err {
int n;
char *m;
} err[]={
1,"out of banknotes",

0,0
};
```

```
struct msg {
int n;
char *m;
} msg[]={

1,   "INFLIGHT FINANCIAL SERVICES Ltd.",
101, "INFLIGHT FINANCIAL SERVICES Ltd.",
201, "INFLIGHT FINANCIAL SERVICES Ltd.",
301, "INFLIGHT FINANCIAL SERVICES Ltd.",
401, "INFLIGHT FINANCIAL SERVICES Ltd.",

2,   "WELCOME TO",
102, "BIENVENUE A",
202, "BENVENUTI A",

3,   "PLEASE INSERT YOUR BANKNOTES BELOW",
103, "SVP INSEREZ VOS BILLETS CI DESSOUS",
203, "   INSERIRE BANCONOTE QUI SOTTO   ",

4,   "OR CREDIT CARD TO THE RIGHT",
104, "OU CARTE DE CREDIT A DROITE",
204, "O CARTA DI CREDITO A DESTRA",

5,   "RATES ",
105, "CHANGE",
205, "CAMBI",

6,   "total change",
106, "change total",
206, "totale cambio",

7,   "THANK YOU",
107, "MERCI",
207, "GRAZIE",

8,   "HAVE A NICE FLIGHT",
108, "BON VOL",
208, "BUON VOLO",

9,   "XCHNG RATE",
109, "TAUX DE CHANGE",
209, "CAMBIO",

10,  "   push GREEN to",
110, "pousser VERT pour",
210, "premere VERDE per",

11,  "END",
111, "FIN",
211, "FINE",

14,"OR CREDIT CARD TO THE RIGHT",
114,"OU CARTE DE CREDIT A DROITE",
214,"O CARTA DI CREDITO A DESTRA",

12,  "COLLECT YOUR CASH",
112, "PRENEZ VOTRE MONNAIE",
212, "PRENDERE LA VALUTA",

917,"AFTER LAST BANKNOTE YOU WISH TO CHANGE",
916,"PUSH RED BUTTON",
918,"WAIT FOR RECEIPT",
921,"SLIDE YOUR CREDIT CARD IN THE MAGNETIC CARD READER",
922,"AERO CASH",
```

```
923,"EXCHANGE MACHINE",
924,"TO",
925,"tm", /* trade */
926,"MAXIMUM AMOUNT OF CHANGE",
927,"YOU HAVE REACHED THE",
928,"ENTER YOUR PERSONAL IDENTIFICATION CODE ON KEYBORD",
929,"CHOOSE AMOUNT",
930,"PLEASE",
931,"IN CASE OF ERROR",
932,"SORRY",
933,"YOUR CARD CANNOT BE IDENTIFIED",

0,0
};
```

Page 40

```
/* ichfchange.h */
struct armatic {
unsigned code;
char *currency;
double value;
} armatic[] = {
1,"dem",100, /* Germany */
2,"dem",50,
3,"dem",20,
4,"dem",10,

5,"frf",200, /* France */
6,"frf",100,
7,"frf",50,

9,"chf",100, /* Switzerland */
10,"chf",50,
11,"chf",20,
12,"chf",10,

13,"gbp",20, /* Unitled Kingdom */
14,"gbp",10,
15,"gbp",5,

16,"itl",100000, /* Italy */
17,"itl",50000,
18,"itl",10000,

19,"nlg",100, /* Nederland */
20,"nlg",50,
21,"nlg",25,
22,"nlg",10,

23,"ats",1000, /* Austria */
24,"ats",500,
25,"ats",100,
26,"ats",50,

27,"cad",100, /* Canada */
28,"cad",50,
29,"cad",20,
30,"cad",10,

31,"jpy",10000, /* Japan */
32,"jpy",5000,
33,"jpy",1000,

34,"esb",5000, /* Spain */
36,"esb",1000,

37,"dkk",500, /* Danmark */
38,"dkk",100,
39,"dkk",50,

40,"sek",100, /* Sweden */
41,"sek",50,
42,"sek",20,
43,"sek",10,

44,"bef",5000, /* Belgium */
45,"bef",1000,
46,"bef",500,
```

We claim:

1. A method of providing currency services during travel comprising the steps of:

providing on a transport vehicle a financial services system comprising an enclosure which is mounted on wheels so as to be readily movable and which includes at least one banknote acceptor, a card reader, a computer interfacing with the at least one banknote acceptor and the card reader; and at least one banknote dispenser for dispensing banknotes in response to control inputs received from the computer;

causing the at least one banknote acceptor to accept banknotes at least from the country from which the transport vehicle has departed; and causing the at least one banknote dispenser to dispense banknotes at least from the country of destination of the transport vehicle.

2. A method of providing currency services during travel according to claim 1 and wherein the step of providing on a transport vehicle a readily movable financial services system includes providing a readily movable financial service system on an aircraft.

3. A method of providing currency services during travel according to claim 1 and wherein said readily movable financial services system is stored in a galley of an aircraft.

4. A method of providing currency services during travel according to claim 3 and where said readily movable financial services system is moved out of the galley of the aircraft when in use.

5. A method of providing currency services during travel according to claim 3 and wherein said readily movable financial services system may be used when stowed in the gallery of the aircraft.

* * * * *